United States Patent
Kawai et al.

(10) Patent No.: US 6,854,709 B2
(45) Date of Patent: Feb. 15, 2005

(54) THROTTLE VALVES HAVING SPHERICAL SHAPED EDGES

(75) Inventors: Shinji Kawai, Obu (JP); Kazuhiko Nishimura, Obu (JP)

(73) Assignee: Aisan Kogyo Kabushiki Kaisha, Obu (JP)

( * ) Notice: Subject to any disclaimer, the term of this patent is extended or adjusted under 35 U.S.C. 154(b) by 12 days.

(21) Appl. No.: 10/322,487

(22) Filed: Dec. 19, 2002

(65) Prior Publication Data

US 2003/0116741 A1 Jun. 26, 2003

(30) Foreign Application Priority Data

Dec. 20, 2001  (JP) ....................................... 2001-388298

(51) Int. Cl.$^7$ ............................................... F16K 1/22
(52) U.S. Cl. ...................... 251/288; 251/305; 123/337
(58) Field of Search ................................ 257/305, 288, 257/306, 307, 308; 123/337

(56) References Cited

U.S. PATENT DOCUMENTS

| | | | | |
|---|---|---|---|---|
| 714,410 A | * | 11/1902 | Stainton et al. | 251/305 |
| 2,920,858 A | * | 1/1960 | Ulrich | 251/305 |
| 3,498,584 A | * | 3/1970 | Bowers | 251/305 |
| 3,677,297 A | * | 7/1972 | Walton | 251/305 |
| 4,407,483 A | | 10/1983 | Gachot | |
| 4,462,358 A | * | 7/1984 | Ishida et al. | 123/337 |
| 4,822,001 A | * | 4/1989 | Sisk | 251/306 |
| 5,295,659 A | * | 3/1994 | Steele | 251/306 |
| 5,315,975 A | * | 5/1994 | Hattori et al. | 123/337 |
| 5,669,350 A | * | 9/1997 | Altmann et al. | 123/337 |
| 5,741,006 A | | 4/1998 | Murai et al. | |
| 6,047,950 A | * | 4/2000 | Pontoppidan et al. | 251/305 |

FOREIGN PATENT DOCUMENTS

| | | |
|---|---|---|
| DM | 1022437 | 1/1958 |
| GB | 2339078 | 5/1991 |

\* cited by examiner

*Primary Examiner*—John Bastianelli
(74) *Attorney, Agent, or Firm*—Dennison, Schultz, Dougherty & MacDonald

(57) ABSTRACT

Throttles (10) include a bore (1b) defined within throttle body (1a). A longitudinal axis defined within the bore serves as a throttle air flow channel. Throttle shaft (3) extends across the air flow channel and is rotatably supported by the throttle body about a rotational axis. Throttle valve (5) is coupled to the throttle shaft and opens and closes the air flow channel by rotating throttle shaft and throttle valve within the bore. The throttle valve extends perpendicularly to the longitudinal axis of the bore when the throttle valve is disposed in a fully closed position. Clearance (S) is defined between a peripheral edge (5a) of throttle valve and an inner wall of the bore when the throttle valve is in the fully closed position. The peripheral edge of the throttle valve end defines a substantially spherical surface having a radius (R) of curvature with respect to the rotational axis.

13 Claims, 5 Drawing Sheets

THROTTLE VALVES HAVING SPHERICAL SHAPED EDGES

This application claims priority to Japanese patent application serial number 2001-388298, the contents of which are hereby incorporated by reference as if fully set forth herein.

BACKGROUND OF THE INVENTION

1. Technical Field

The present invention relates to throttle valves and throttles using such throttle valves. For example, the present invention relates to throttles that may be suitably utilized to adjust the flow of intake air into internal combustion engines.

2. Description of the Related Art

A known throttle is described in Japanese Laid-Open Patent Publication No. 9-4473 and the known throttle has been reproduced herein in FIGS. 6 to 8. FIG. 6 shows a schematic side view of the throttle, FIG. 7 is a side cross-sectional view of the throttle, and FIG. 8 is an enlarged view of a portion of FIG. 7. As shown in FIG. 7, a bore 11b is formed within a throttle body 11 in order to define an intake air channel 11a. The intake air channel 11a communicates with an internal combustion engine in order to supply a flow of air to the internal combustion engine. A throttle shaft 13 is rotatably supported on the throttle body 11 so as to extend across the intake air channel 11a. A throttle valve 15 is configured as a substantially circular disk-shaped butterfly valve and is affixed to the throttle shaft 13. Therefore, the throttle valve 15 can be rotated to open and close the intake air channel 11a. In FIGS. 6 to 8, the throttle valve 15 is shown in the fully closed position.

Referring to FIG. 6, a stopper 12 is mounted on the throttle body 11 in a position outside of the intake air channel 11. A lever 14 is affixed to the throttle shaft 13 and is designed to contact the stopper 12 when the throttle valve 15 is in the fully closed position. Although not shown in the drawings, the lever 14 is connected to an accelerator via a wire. In addition, the throttle shaft 13 is biased by a spring (not shown) in the closing direction (clockwise direction as viewed in the drawings) of the throttle valve 15. As shown in FIG. 6, when the lever 14 contacts the stopper 12 in the fully closed position of the throttle valve 15, the throttle valve 15 is positioned perpendicular to an axial line or longitudinal axis L1 of the bore 11b (see FIG. 7).

Referring to FIG. 7, a bypass channel 11c is defined within the throttle body 11 and an orifice 16 is disposed within the bypass channel 11c. Therefore, the total amount of air that flows through the intake air channel 11a when the throttle valve 15 is disposed in the fully closed position (i.e., the amount of air that flows through the intake air channel 11a when the engine is idling) can be adjusted by changing the position of orifice 16 with respect to the bypass channel 11c. Thus, the amount of air that flows when the engine is idling will be the sum of the amount of air flow through a clearance S (which clearance S is defined between an inner wall of the bore 11b and the throttle valve 15 as shown in FIG. 8) and the amount of air flow through the bypass channel 11c.

SUMMARY OF THE INVENTION

As noted above, when the throttle valve 15 is in the fully closed position (i.e., when the lever 14 contacts the stopper 12 as shown in FIG. 6), the throttle valve 15 extends perpendicular to the longitudinal axis L1 of the throttle body bore 11b (see FIG. 7). As a result of investigations performed by the present inventors, it was discovered that the position of the throttle valve 15 disposed in the fully closed position may be changed from the ideal position (i.e., a precisely perpendicular position) due to assembly errors or wear of the throttle parts after extended use. If the throttle valve 15 is not disposed in the ideal position (i.e., the precisely perpendicular position) when the engine is idling, the width of the clearance S between the throttle body 11 and the throttle valve 15 will be narrowed, as shown by dotted lines in FIG. 8, because the throttle valve 15 has a flat peripheral edge 15a. Consequently, the amount of air flow through the intake air channel 11a will be less than the ideal amount of air flow when the throttle valve 15 is disposed in the fully closed position and the proper idling speed can not be reliably set.

In other words, the width of the clearance S is determined by the flat peripheral edge 15a and the inner wall of bore 11a. When the known throttle valve 15 having the flat peripheral edge 15a is perpendicular with respect to the bore 11a in the fully closed position, the ideal amount of air flow will be supplied to the internal combustion engine. However, if the stopper 12 and/or the lever 14 wears down due to extended use (or the throttle 11 is assembled improperly), the throttle 15 will not be precisely perpendicular to the bore 11 in the fully closed position (i.e., the position of throttle valve 15 shown by dotted lines in FIG. 8). Therefore, the respective corners 15b of each peripheral edge 15a will be shifted toward the inner wall of the bore 11b and the width of the clearance S will be reduced. In this case, less than the ideal amount of air flow will be supplied to the internal combustion engine and it will be necessary to adjust the position of the orifice 16 in order to re-set the air flow that is supplied to the engine during idling.

Thus, the known throttle is subject to variations in the amount of air flow through the clearance S due to changes in the fully closed position of the throttle valve 15 that may be caused by improper assembly or wear of parts within the throttle 11.

It is, accordingly, one object of the present invention to overcome this problem of the known art and to teach improved techniques for minimizing variations in amount of air flow through a throttle.

According to one aspect of the present teachings, throttle valves are taught that preferably have a curved peripheral edge. For example, the peripheral edge of the throttle valve may have a radius of curvature with respect a rotational axis of the throttle valve. In this case, the distance or clearance between the peripheral edge of the throttle valve and the inner wall of the throttle flow channel will not vary, or will not substantially vary, when the throttle valve is disposed in the fully closed position within the flow channel, even if the throttle has not been assembled properly or parts of the throttle have become worn after extended use of the throttle. That is, the throttle valve will rotate about its rotational axis as long as a vertical line extending from the rotational center of the throttle valve to the inner wall of the flow channel intersects a portion of the curved peripheral edge. As a result, the amount of air flow through the flow channel preferably does not change, even if the throttle valve is not precisely disposed perpendicular to the inner wall of the flow channel in the fully closed position.

In another aspect of the present teachings, the shape of the curved peripheral edge with respect to the direction of the rotational axis preferably conforms to the shape of the inner wall of the flow channel. For example, if the flow channel has a cylindrical shape and the longitudinal axis of the cylinder is perpendicular to the rotational axis of the throttle valve, the curved peripheral edge also may be curved with respect to the longitudinal axis of the flow channel. In this case, the curved peripheral edge may have a substantially spherical configuration.

According to another aspect of the present teachings, throttles are taught that include the above-noted throttle valves. For example, the throttle valve may be disposed such that a minimum clearance is provided between the curved peripheral edge of the throttle valve and the inner wall of the flow channel when the throttle valve is disposed in the fully closed position. The throttle valve may, e.g., extend substantially perpendicular to the inner wall of the flow channel when the throttle valve is disposed in the fully closed position.

In this aspect, the width of the minimum clearance will remain constant within a small range of rotation of the throttle valve about the fully closed position. Thus, even if the throttle valve is slightly displaced from the perpendicular position with respect to the inner wall of the flow channel when the throttle valve is disposed in the fully closed position, the amount of air flow through the flow channel preferably does not change, or does not substantially change. For example, the throttle valve may not stopped at the fully closed position (i.e., the precisely perpendicular position), but may stopped at a position slightly displaced from the fully closed position (i.e., slightly displaced from the position in which the throttle valve is perpendicular to the longitudinal axis of the throttle body bore) due to an assembly error or any other factors when the throttle valve is actuated to close the flow channel. Thus, as a result of the present teachings, fluctuations or variations in the amount of air flow through the clearance when the throttle valve is disposed in the fully closed position may be reliably prevented, even if the throttle valve is slightly displaced from the position in which the throttle valve is perpendicular to the longitudinal axis of the throttle body bore.

BRIEF DESCRIPTION OF THE DRAWINGS

Additional objects, features and advantages of the present invention will be readily understood after reading the following detailed description together with the claims and the accompanying drawings, in which:

DETAILED DESCRIPTION OF THE INVENTION

Figure 1:
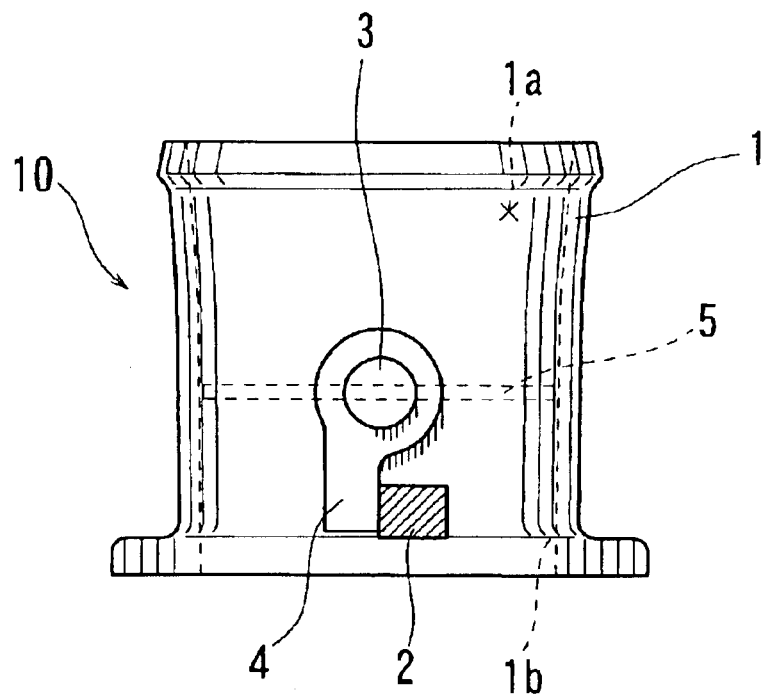
FIG. 1 is a side view of a first representative throttle.

In one embodiment of the present teachings, throttle valves may have a curved peripheral edge and more preferably, the curved peripheral edge may have a substantially spherical shape. The radius of curvature about the rotational center of the throttle valve preferably intersects the longitudinal axis of a throttle body. In this case, the width or minimum clearance between the spherical edge and an inner wall of the flow channel defined within the throttle body preferably does not change, or does not substantially change, during operation. Thus, the fully closed position of the throttle valve may be more reliably set as compared to known throttles. Preferably, the amount of air flow through the flow channel does not change, or does not substantially change, even if the throttle valve is not precisely perpendicular to the inner wall of the flow channel when the throttle valve is disposed in the fully closed position.

The entire peripheral edge of the throttle valve may have a spherical shape or only a portion of the peripheral edge may have a spherical shape. For example, the spherical portion may be formed only on one-half of the peripheral edge with respect to the rotational direction. The remaining half of the peripheral edge may have a cylindrical shape with respect to the same axis as the longitudinal axis of the fluid channel.

If the throttle valve is designed for use in a throttle body having a cylindrical flow channel, the throttle valve may have a circular configuration as viewed in the width direction of the throttle valve. In the alternative, the throttle valve may have an elliptical shape. The configuration of the throttle valve may be appropriately determined by considering the configuration of the flow channel.

In another embodiment of the present teachings, throttles are taught that include throttle valves as described above. The throttle may include a bore defined within a throttle body. The bore may serve as an air flow channel. The throttle valve may be disposed within the bore and may rotate relative to the bore about a rotational axis. In this case, the amount of air flow through the bore will vary in response to the rotational position of the throttle valve.

In another embodiment, the throttle valve preferably extends perpendicular, or substantially perpendicular, with respect to the longitudinal axis of the bore when the throttle valve is disposed in a fully closed position. A minimum clearance is preferably defined between the peripheral edge of the throttle valve and an inner wall of the bore when the throttle valve is disposed in the fully closed position.

In another embodiment of the present teachings, throttles may also include a throttle shaft having a rotational axis. The throttle body may rotatably support the throttle shaft and the throttle valve may be fixed in position relative to the throttle shaft. Throttles also may include a lever and a stopper that is designed to abut the lever when the throttle valve is disposed in the fully closed position. The lever may be affixed to the throttle shaft and the stopper may be disposed outside of the lever. Thus, the lever may contact the stopper so as to define the fully closed position of the throttle valve.

Each of the additional features and teachings disclosed above and below may be utilized separately or in conjunction with other features and teachings to provide improved throttle valves and throttles and methods for designing and using such throttle valves and throttles. Representative examples of the present invention, which examples utilize many of these additional features and teachings both separately and in conjunction, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detail description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

A first representative throttle 10 will now be described with reference to FIGS. 1 to 4. The representative throttle 10 may communicate with an internal combustion engine (not shown) and may be operable to adjust the supply of intake air to the engine.

Figure 2:
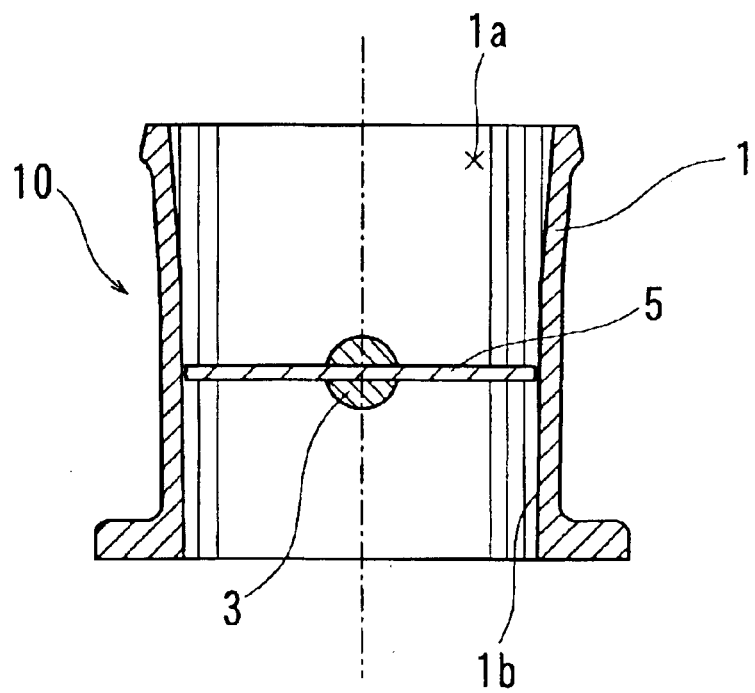
FIG. 2 is a side, cross-sectional view of the first representative throttle.

Referring to FIG. 2, the representative throttle 10 may include a throttle body 1. A substantially cylindrical bore 1b may be defined within an intake air channel 1a that communicates with the engine. A throttle shaft 3 may be rotatably supported by the throttle body 1 and may extend across the intake air channel 1a. One end of the throttle shaft 3 may extend or project outside of the throttle body 1.

A throttle valve 5 may be disposed within the intake valve channel 1a in order to open and close the intake valve channel 1a. The throttle valve 5 may be configured as a substantially circular-disk shaped butterfly valve and may be secured to the throttle shaft 3. In FIGS. 1 to 4, the throttle valve 5 is shown in the fully closed position. The throttle valve 5 may open the intake air channel 1a when the throttle valve 5 rotates in the clockwise direction from the fully closed position as indicated by an arrow in FIG. 4.

Referring to FIG. 1, a block-shaped stopper 2 may be mounted on the throttle body 1 at a position outside of the intake air channel 1a. Further, a lever 4 may be secured to the end of the throttle shaft 3 that extends outside of the throttle body 1. In this case, the throttle shaft 3, the throttle valve 5 and the lever 4 will rotate together. The lever 4 preferably contact the stopper 2 when the throttle valve 5 is disposed in the fully closed position. The lever 4 may be connected to an accelerator via an appropriate wire (not shown). In addition, the throttle shaft 3 may be biased by a spring (not shown) in the closing direction (counterclockwise direction as viewed in FIGS. 1 to 4) of the throttle valve 5.

When the accelerator is opened against the biasing force of the spring, the throttle shaft 3 will rotate via the wire and the lever 4. As a result, the angle of the throttle valve 5 with respect to the intake air channel 1a will change. Therefore, the amount of intake air that flows through the intake air channel 1a of the throttle body 1 may be adjusted by changing the angle of the throttle valve 5 with respect to the longitudinal axis of the bore 1b. When the accelerator is not operated, the lever 4 preferably abut the stopper 2, and the throttle valve 5 may be held or reliably positioned in the fully closed position of the throttle valve 5.

Figure 3:
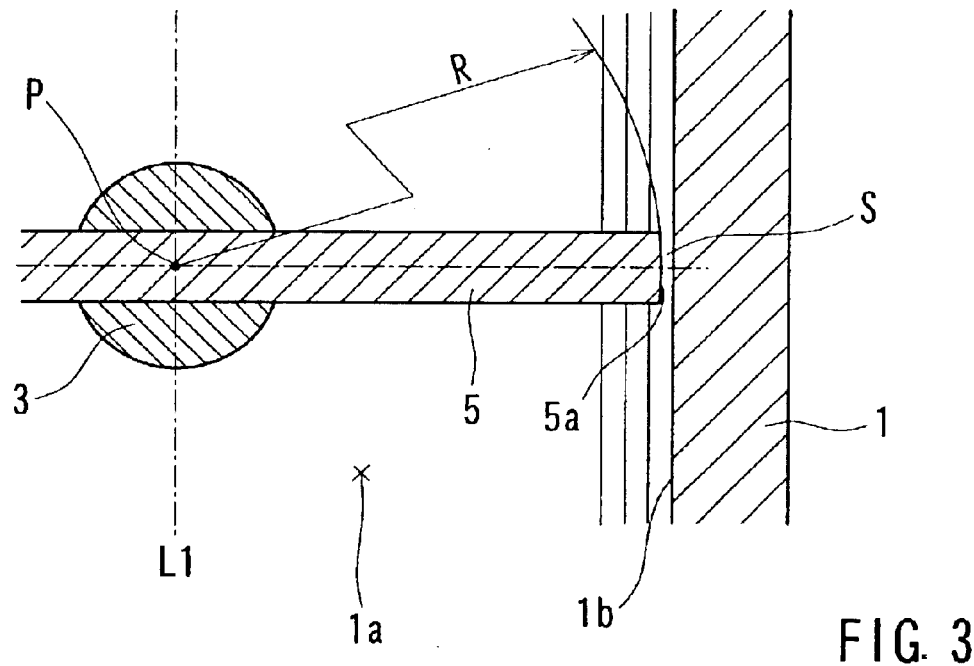
FIG. 3 is an enlarged view of a portion of FIG. 2.
Figure 4:
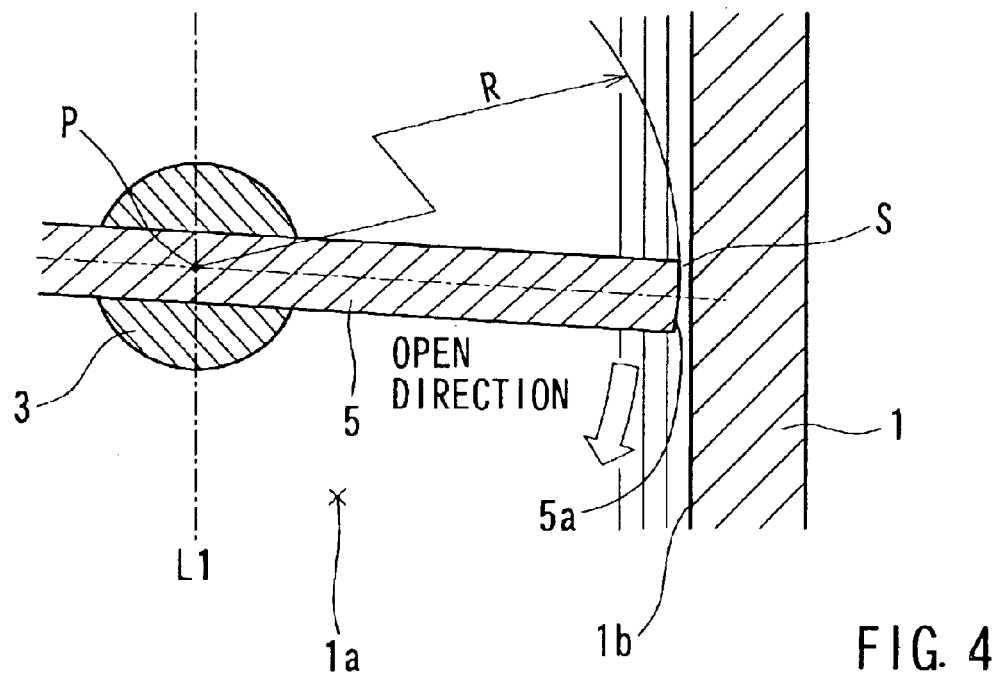
FIG. 4 is an explanatory view illustrating the throttle valve disposed in the fully closed position, but the throttle valve is not perpendicular to the inner wall of the flow channel.
Figure 5:
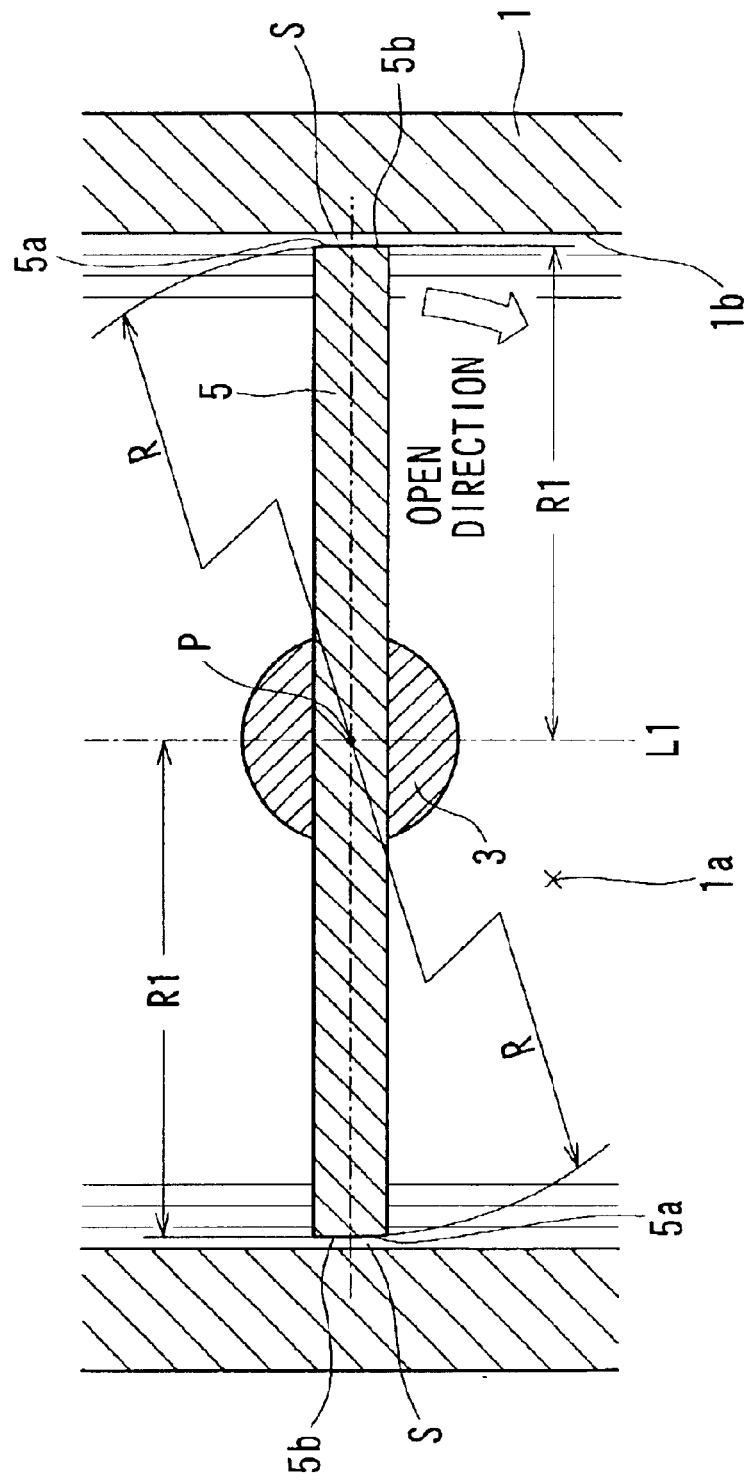
FIG. 5 is a side, cross-sectional view of a second representative throttle.
Figure 6:
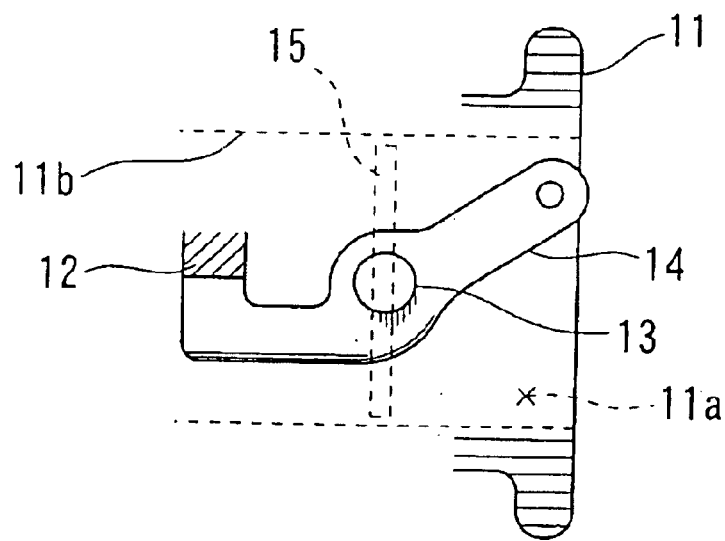
FIG. 6 is a schematic side view of a known throttle.

As shown in FIGS. 1 to 3, the relationship between the lever 4 and the stopper 2 is preferably selected such that the throttle valve 5 extends perpendicular to the longitudinal axis L1 of the throttle body bore 1b when the lever 4 abuts the stopper 2 (i.e., when the throttle valve 5 is disposed in the fully closed position). Further, when the throttle valve 5 is disposed in the fully closed position, a predetermined clearance S may be defined between the inner wall of the bore 1b and a peripheral edge 5a of the throttle valve 5. In this representative embodiment, the entire peripheral edge 5a has a spherical configuration or shape and a radius R of curvature is defined about point P on the rotational axis, i.e., the central axis, of the throttle shaft 3, as shown in FIGS. 3–5.

According to the first representative throttle 10, the amount of intake air flowing through the intake air channel 1a when the throttle valve 5 is disposed in the fully closed position (i.e., the amount of intake air that will be supplied to the engine when the engine is idling) will equal to the amount of intake air that flows through clearance S between the inner wall of the throttle body bore 1b and the peripheral edge 5a of the throttle valve 5. When the throttle valve 5 reaches the fully closed position as shown in FIG. 1, the lever 4 preferably contacts the stopper 2, so that the throttle valve 5 is reliably positioned to extend substantially perpendicular to the longitudinal axis L1. As noted above, the peripheral edge 5a of the throttle valve 5 may preferably have a substantially spherical configuration having radius R about point P on the rotational axis of the throttle shaft 3.

Therefore, the width of clearance S between the inner wall of the throttle body bore 1b and the throttle valve 5 may be maintained as a substantially constant width, even if the fully closed position of throttle valve 5 has varied within a small angle of rotation. Thus, due to the spherical configuration of the peripheral edge 5a, the width of clearance S between the inner wall of the bore 1b and the peripheral edge 5a of the throttle valve 5 will not change as long as the throttle valve 5 is not shifted from the perpendicular position by an angle that is greater than half the angular range of the peripheral edge 5a about point P.

Figure 7:
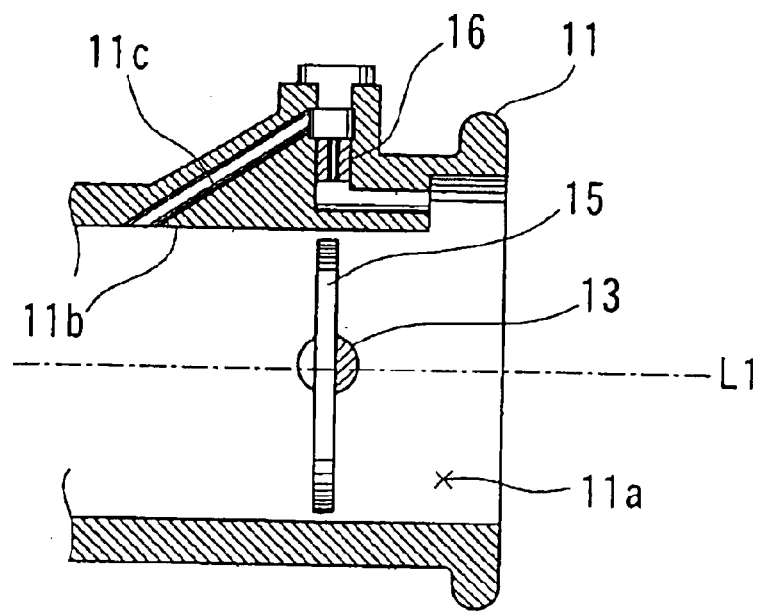
FIG. 7 is a side, cross-sectional view of the known throttle.
Figure 8:
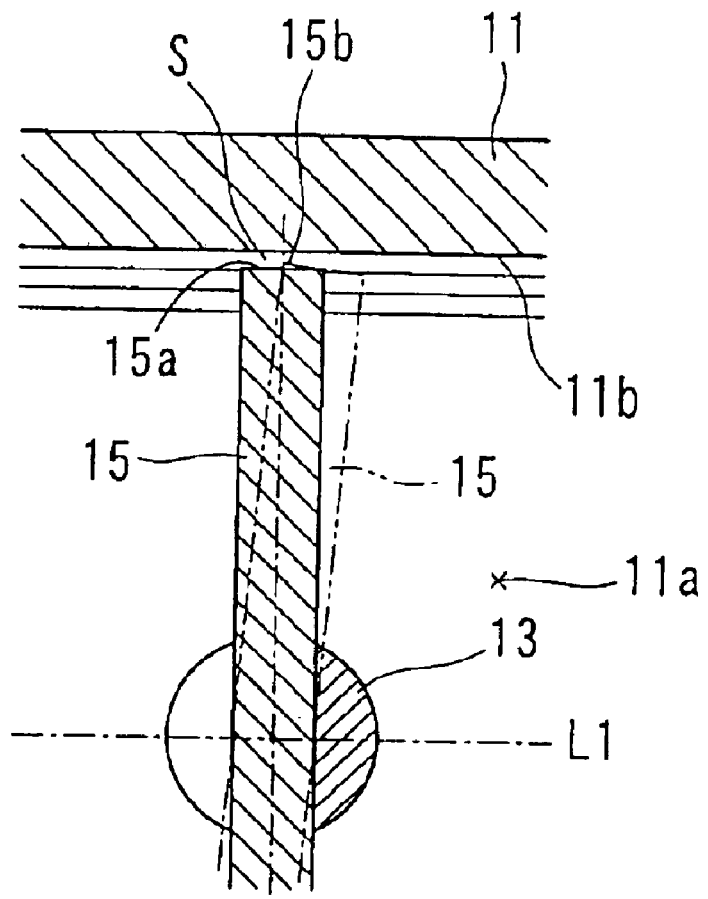
FIG. 8 is an enlarged view of a portion of FIG. 7.

As a result, it is possible to minimize or eliminate fluctuations in the flow of intake air due to small changes in the rotational position of the throttle valve 5 when the throttle valve 5 is disposed in the fully closed position. Therefore, according to the representative throttle 10, the bypass channel 11c and the orifice 16 that were required in the known throttle (see FIG. 7) are no longer necessary and thus, manufacturing costs can be reduced. Furthermore, it is not necessary to adjust the position of the orifice 16, because the orifice 16 is no longer required. Moreover, even if minor assembly errors occur or the parts (e.g., the lever 4 and stopper 2) of the throttle 10 wear down during extended operation of the throttle 10, the idling speed of the engine will not be affected.

A second representative embodiment will now be described with reference to FIG. 5. The second representative embodiment is a modification of the first representative embodiment. Therefore, like elements have been assigned the same reference numerals as the first representative embodiment and further explanation of such parts is not necessary.

In the second representative embodiment, the peripheral edge 5a of the throttle valve 5 may include non-spherical portions 5b on the side of the valve opening direction (i.e., the upper, right quarter and the lower, left quarter as viewed in FIG. 5). For example, the non-spherical portions 5b may be configured as cylindrical surfaces (or substantially cylindrical surfaces) that extend in parallel with the longitudinal axis L1 of the throttle body bore 1b when the throttle valve 5 is disposed in the fully closed position. In addition, radius R1 measured from the longitudinal axis L1 to the non-spherical portions 5b may be equal to radius R.

The remaining portions (i.e., the upper, left quarter and the lower, right quarter of the peripheral edge 5a) may define substantially spherical surfaces in the same manner as the first representative embodiment. According to the second representative embodiment, the width of clearance S may be maintained at a constant width (or substantially constant width) as long as changes in the position of the throttle valve 5 from the fully closed position (i.e., the substantially perpendicular position) remain within a small angle of rotation. Thus, the amount of air flow through the throttle 10 will not change, or will not substantially change, even if the throttle valve 5 is not precisely perpendicular to the inner wall of throttle body bore 1b when the throttle valve 5 is disposed in the fully closed position As a result, fluctuations in the amount of intake air flow due to a shift of the throttle valve 5 from the fully closed position can be minimized or eliminated in the same manner as the first representative embodiment.

The second representative embodiment may be particularly advantageous if the throttle valve has a relatively large thickness. However, the second representative embodiment is typically only suitable if the position of the throttle valve does not fluctuate in the opposite direction from the fully closed position.

Although the thickness of the non-spherical portions 5b is equal to the thickness of the remaining portions of the peripheral edge 5a of the throttle valve 5 in the second representative embodiment, the ratio of thickness between the non-spherical portions 5b and the thickness of the remaining portions may be appropriately determined according to various conditions.

The first and second representative embodiments may be modified in various ways. Although the throttle body bore 1b of the first and second representative embodiments has a circular configuration as viewed in the axial direction, the bore 1b may have other configurations, such as a rectangular configuration or an elliptical configuration. In such case, the throttle valve 5 also may have a configuration (i.e., outer dimension) similar to the configuration of the bore 1b.

In addition, the spherical portion of the throttle valve 5 may be defined partly along the peripheral edge 5a in the circumferential direction.

Further, the above representative embodiments have been described in connection with throttles in which the opening angle of the throttle valves may be changed by operating an accelerator that is connected to the lever via the wire. However, the present teachings also may be applied to throttles in which an ECU (electronic control unit) receives input signals from various sensors and outputs control signals to an electric drive device, e.g., a motor, that is coupled to the throttle valve in order to control or change the opening angle of the throttle valve.

Furthermore, the above representative embodiments do not require a bypass channel and an orifice defined in the bypass channel, which are requirements of known throttles. However, a bypass channel and an orifice may be still be incorporated, if desired. In addition, although the representative throttle devices have been described for controlling the amount of intake air supplied to an internal combustion engine, the present throttle also may be used for controlling the flow of exhaust gas from the engine.

What is claimed is:

1. A throttle valve comprising:

a rotational axis and an outer peripheral edge;

wherein the peripheral edge includes a spherical curved portion having a radius of curvature with respect to a point on the rotational axis, and a cylindrical curved portion having a radius of curvature with respect to the rotational axis, and wherein the spherical curved portion and the cylindrical curved portion are formed on one side and the other side in the thickness direction of the throttle valve, respectively.

2. A throttle valve as in claim 1, wherein the peripheral edge has a substantially circular configuration as viewed in the thickness direction of the throttle valve.

3. A throttle comprising:

a throttle valve having a rotational axis and an outer peripheral edge, a throttle body having a longitudinal axis, and a bore defined within the throttle body, wherein the throttle valve is rotatably disposed within the bore about the rotational axis, such that the amount of air flow through the bore varies in response to the rotational position of the throttle valve with respect to the bore;

wherein the peripheral edge of the throttle valve includes a spherical curved portion having a radius of curvature with respect to a point on the rotational axis, and a cylindrical curved portion having a radius of curvature with respect to the rotational axis, and wherein the spherical curved portion and the cylindrical curved portion are formed on one side and the other side in the thickness direction of the throttle valve, respectively.

4. A throttle as in claim 3, wherein the throttle valve extends substantially perpendicular to the longitudinal axis of the bore when the throttle valve is disposed in a fully closed position, and wherein a clearance is defined between the peripheral edge of the throttle valve and an inner wall of the bore when the throttle valve is disposed in the fully closed position, and wherein a passage for a flow of air being defined in the fully closed position of the throttle valve by the clearance, and the width of the clearance is substantially constant at a small angle of rotation of the throttle valve due to the peripheral edge of the throttle valve including the spherical curved portion and the cylindrical curved portion.

5. A throttle as in claim 4, further including a throttle shaft rotatably supported within the throttle body and being affixed to the throttle valve.

6. A throttle as in claim 5, further including a lever, and a stopper arranged and constructed to abut the lever when the throttle valve is disposed in the fully closed position, wherein the lever is affixed to the throttle shaft and the stopper is disposed outside of the bore.

7. A throttle as in claim 3, wherein the peripheral edge has a substantially circular configuration as viewed in the thickness direction of the throttle valve.

8. A throttle comprising:

a throttle body, a bore defined within the throttle body, wherein a longitudinal axis is defined within the bore and the bore serves as an air flow channel, a throttle shaft extending across the air flow channel and being rotatably supported by the throttle body about a rotational axis;

a throttle valve affixed to the throttle shaft and being arranged and constructed to open and close the air flow channel by rotating the throttle shaft and the throttle valve within the bore, the throttle valve being further arranged and constructed such that the throttle valve extends substantially perpendicular to the longitudinal axis of the bore when the throttle valve is disposed in a fully closed position with respect to the bore, and wherein a clearance is defined between a peripheral edge of the throttle valve and an inner wall of the bore when the throttle valve is disposed in the fully closed position, a stopper disposed on the throttle body in a position outside of the air flow channel, and a lever coupled to the throttle shaft and being arranged and constructed to contact the stopper when the throttle valve is disposed in the fully closed position, wherein the peripheral edge of the throttle valve includes a spherical curved portion having a radius of curvature with respect to a point on the rotational axis, and a cylindrical curved portion having a radius of curvature with respect to the rotational axis, and wherein the spherical curved portion and the cylindrical curved portion are formed on one side and the other side in the thickness direction of the throttle valve, respectively.

9. A throttle as in claim 8, wherein the peripheral edge has a substantially circular configuration as viewed in the thickness direction of the throttle valve.

10. A throttle valve as in claim 1, wherein the throttle valve has a right side half and a left side half with respect to the rotational axis, and the spherical curved portion and the cylindrical curved portion are positioned on the side of a valve closing direction and the side of a valve opening direction, respectively, of each of the right and left side halves.

11. A throttle valve as in claim 1, wherein each of the spherical curved portion and the cylindrical curved portion extends in the thickness direction along a length corresponding to substantially half the thickness of the throttle valve.

12. A throttle as in claim 3, wherein the throttle valve has a right side half and a left side half with respect to the rotational axis, and the spherical curved portion and the cylindrical curved portion are positioned on the side of a valve closing direction and the side of a valve opening direction, respectively, of each of the right and left side halves.

13. A throttle as in claim 3, wherein each of the spherical curved portion and the cylindrical curved portion extends in the thickness direction along a length corresponding to substantially half the thickness of the throttle valve.

* * * * *